UNITED STATES PATENT OFFICE.

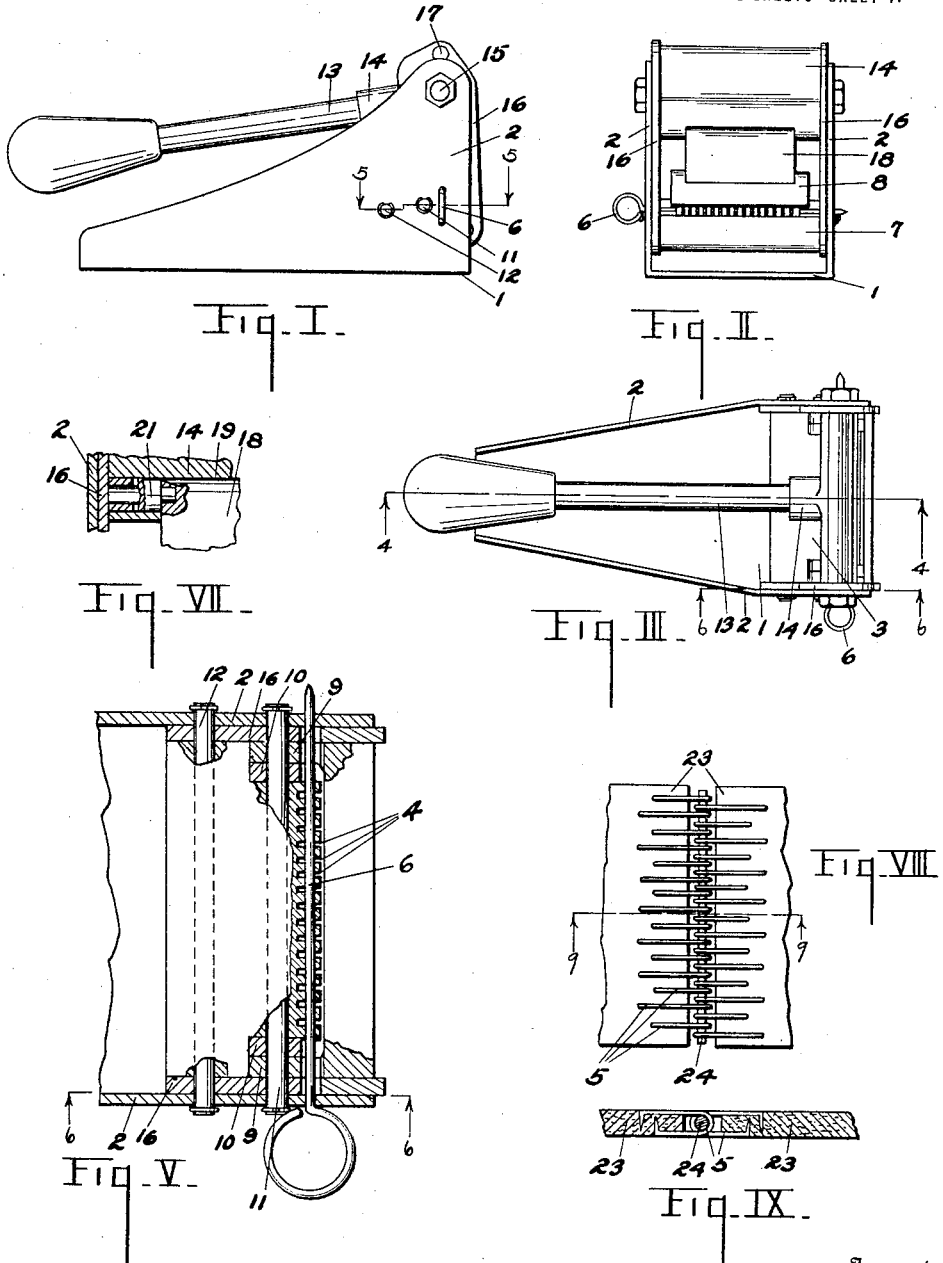

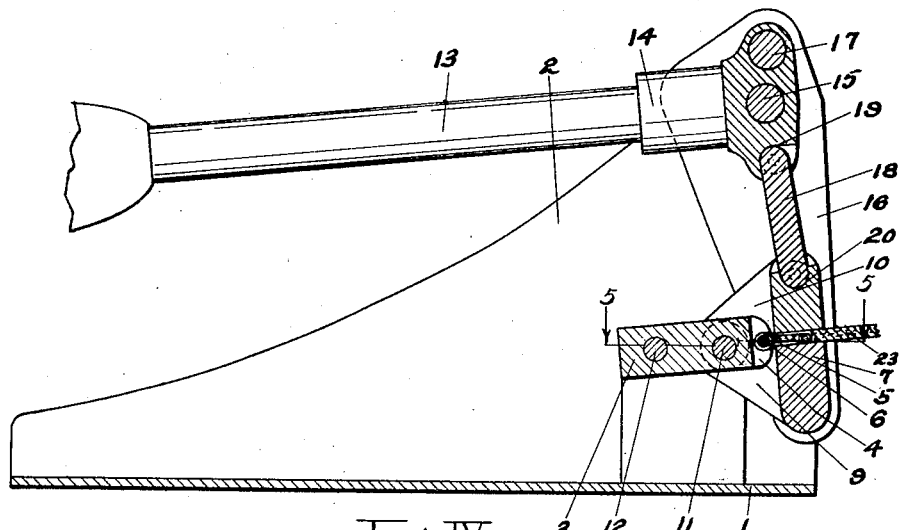
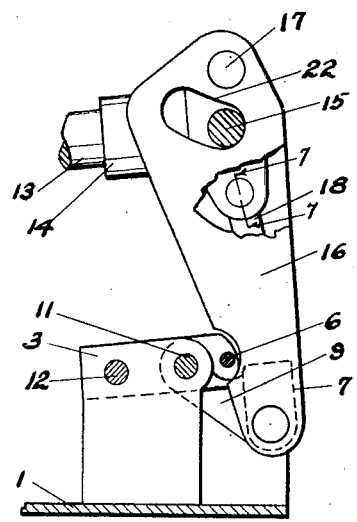
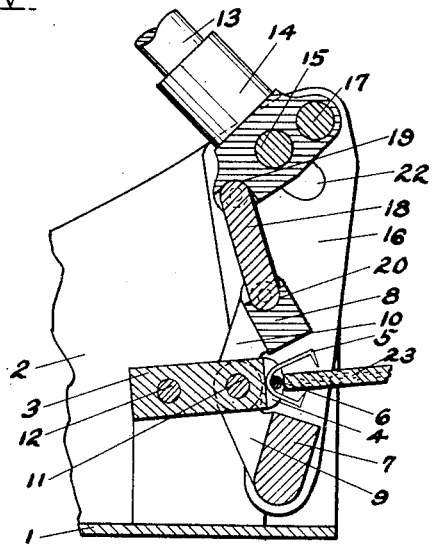

JAMES K. DIAMOND, OF GRAND RAPIDS, MICHIGAN, ASSIGNOR TO CLIPPER BELT LACER COMPANY, OF GRAND RAPIDS, MICHIGAN.

BELT-FASTENER-SETTING MACHINE.

1,328,424.     Specification of Letters Patent.     Patented Jan. 20, 1920.

Application filed September 10, 1919. Serial No. 322,836.

*To all whom it may concern:*

Be it known that I, JAMES K. DIAMOND, a citizen of the United States, residing at Grand Rapids, Michigan, have invented certain new and useful Improvements in Belt-Fastener-Setting Machines, of which the following is a specification.

This invention relates to improvements in belt fastener setting machines.

The main objects of this invention are:

First, to provide an improved belt fastener setting machine which is compact in structure and light in weight, so that it may be easily carried about or transported from machine to machine where it is desired to repair or join belt ends, particularly belts of comparatively small size, such as are largely used in the cotton and like industries.

Second, to provide a machine for setting belt fasteners which embodies the above advantages and at the same time is easily manipulated by hand, and is strong and durable.

Further objects, and objects relating to structural details, will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing, forming a part of this specification, in which:

Figure I is a side view of a machine embodying the features of my invention.

Fig. II is a front view.

Fig. III is a plan view.

Fig. IV is a vertical longitudinal section on a line corresponding to line 4—4 of Fig. III with the jaws closed upon a piece of work, a portion of the actuating lever being shown in full lines, its handle being partially broken away.

Fig. IV^A is a vertical section corresponding to that of Fig. IV, with the jaws in open position, a belt end being shown in position to receive the fasteners arranged in the holder.

Fig. V is a detail view, partially in section, on a line corresponding to line 5—5 of Figs. I and IV, showing details of the fastener holder.

Fig. VI is a detail vertical section on a line corresponding to line 6—6 of Figs. III and V, showing details of the jaw actuating means, the jaws being shown in closed position.

Fig. VII is a detail section on a line corresponding to line 7—7 of Fig. VI, showing details of the actuating means for the upper jaw.

Fig. VIII is a detail plan view of a belt having fasteners as inserted by my machine.

Fig. IX is a detail section on a line corresponding to line 9—9 of Fig. VIII.

In the drawings, similar reference characters refer to similar parts throughout the several views, and the sectional views are taken looking in the direction of the little arrows at the ends of the section lines.

Referring to the drawing, I provide a frame 1 which, in the structure illustrated, is formed of a plate turned up to provide side members 2. The frame is tapered toward its rear end, as illustrated in Fig. III. Between the side members is mounted a block-like belt fastener holder 3, having spaced grooves 4 in its forward edge or face adapted to receive the belt fasteners 5. These, in practice, are mounted on cards so that they may be readily inserted.

The fasteners are retained in the holder by means of the locking rod 6, which is inserted transversely through the grooves 4, as shown in Fig. V. The side members have holes therein alined with the hole in the holder so that the rod may be inserted from the outside, as shown. The staples are closed or set by means of the jaws 7 and 8, which have rearwardly-projecting arms 9 and 10, respectively, mounted on the rod 11 which is inserted through the side members of the frame and the holder, and constitutes a holder supporting member, the holder being further supported by the rod 12.

The actuating lever 13 is provided with a head 14 mounted on the pivot 15. The lower jaw is connected to this lever by the links 16, which are eccentrically connected to the lever at 17. The upper jaw is connected to the lever by the link 18, the ends of which are seated in bearing seats 19 in the lever and 20 in the jaw. The pivots 21 hold the parts together, although the thrust is sustained by the bearing seats. The pivots 21 and the pivot 15 of the lever are so disposed that a toggle action is secured when the lever is actuated to close the jaws, thereby securing a powerful leverage on both the upper and lower jaws.

The links 16 are slotted at 22 to receive the lever pivot 15 and permit the swinging of the links, see Figs. IV^A and VI. The machine may be supported on its rear end to facilitate the arrangement of the fasteners in the holder and the rod 6 inserted and the machine then placed on the base. The belt end 23 is held in position to receive the fasteners by the operator with one hand while the jaws are closed with the other. After the closing of the jaws, as shown in Fig. IV, the locking rod is removed and the operation may be repeated with the opposite end of the belt and the ends joined by the pin 24.

While my improved belt fastener setting machine is especially designed by me for setting fasteners in small belts and to be transported or carried to the work, it is advantageous for embodiment in large machines, as the jaws are closed with comparatively little effort on the part of the operator, and the parts are so disposed that the strain thereon is largely balanced by one part offsetting the strain of another.

I have illustrated and described my improvements in a simple and practical embodiment. I have not attempted to illustrate or describe in detail certain embodiments or improvements which I contemplate, as I believe the disclosure made will enable those skilled in the art to embody my invention or improvements as may be desired.

Having thus described my invention, what I claim as new and desire to secure by Letters Patent is:

1. In a machine for setting belt fasteners, the combination of a frame comprising a pair of side members, a fastener holder disposed between said side members to face forwardly and having spaced fastener receiving grooves in its face, a locking pin insertible through said holder transversely of said grooves and adapted to be inserted and removed through one of the side members, coacting jaws having rearwardly projecting arms at their ends, a pivot therefor constituting a supporting member for said holder, said holder being recessed at its ends to receive said arms, an actuating lever pivotally mounted between said side members above said jaws, links connected to the ends of the lower jaw and eccentrically connected to said lever, and a link connecting the upper jaw to said lever, the pivots connecting said link to said lever and said jaw being disposed relative to the lever pivot so that a toggle action is secured in closing the jaw, said machine being adapted to rest on the end of the frame to facilitate the introduction of the fastener.

2. In a machine for setting belt fasteners, the combination of a frame comprising a pair of side members, a fastener holder disposed between said side members, coacting jaws having rearwardly-projecting arms at their ends, a pivot therefor constituting a supporting member for said holder, said holder being recessed at its ends to receive said arms, an actuating lever pivotally mounted between said side members above said jaws, links connected to the ends of the lower jaw and eccentrically connected to said lever, and a link connecting the upper jaw to said lever, the pivots connecting said link to said lever and said jaw being disposed relative to the lever pivot so that a toggle action is secured in closing the jaw.

3. In a machine for setting belt fasteners, the combination of a frame comprising a pair of side members, a fastener holder disposed between said side members to face forwardly and having spaced fastener receiving grooves in its face, a locking pin insertible through said holder transversely of said grooves and adapted to be inserted and removed through one of the side members, coacting pivoted jaws, an actuating lever pivotally mounted between said side members above said jaws, links connected to the ends of the lower jaw and eccentrically connected to said lever, and a link connecting the upper jaw to said lever, the pivots connecting said link to said lever and said jaw being disposed relative to the lever pivot so that a toggle action is secured in closing the jaw, said machine being adapted to rest on the end of the frame to facilitate the introduction of the fastener.

4. In a machine for setting belt fasteners, the combination of a frame comprising a pair of side members, a fastener holder disposed between said side members, coacting pivoted jaws, an actuating lever pivotally mounted between said side members above said jaws, links connected to the ends of the lower jaw and eccentrically connected to said lever, and a link connecting the upper jaw to said lever, the pivots connecting said link to said lever and said jaw being disposed relative to the lever pivot so that a toggle action is secured in closing the jaw.

5. In a machine for setting belt fasteners, the combination of a frame, a fastener holder having spaced fastener receiving grooves, a locking pin insertible through said holder transversely of said grooves, coacting jaws pivotally mounted on said frame, an actuating lever pivotally mounted on said frame, a link connecting the lower jaw to said lever at one side of its pivot, and a link connecting the upper jaw to said lever at the opposite side of its pivot, the pivots connecting said link to said lever and said jaws being disposed relative to the lever pivot so that a toggle action is secured in closing both jaws.

6. In a machine for setting belt fasteners, the combination of a frame, a fastener holder, coacting pivoted jaws pivotally mounted on said frame, an actuating lever pivotally mounted on said frame, a link connecting the lower jaw to said lever at one side of its pivot, a link connecting the upper jaw to said lever at the opposite side of its pivot, the pivots connecting said link to said lever and said jaws being disposed relative to the lever pivot so that a toggle action is secured in closing both jaws.

7. In a machine for setting belt fasteners, the combination of a frame, coacting jaws pivotally mounted on said frame, an actuating lever pivotally mounted on said frame, links connecting each of said jaws to said lever, and pivots for the lever and connecting the links to the lever and said jaws being disposed so that when the lever is actuated to close the jaws, the pivots are brought to an approximate alined position.

In witness whereof, I have hereunto set my hand and seal in the presence of two witnesses.

JAMES K. DIAMOND. [L. S.]

Witnesses:
  M. BERGERS,
  FRED V. HALLAM.